United States Patent
Prasad et al.

(10) Patent No.: US 12,223,121 B2
(45) Date of Patent: Feb. 11, 2025

(54) ARTIFICIAL INTELLIGENCE-BASED SYSTEM AND METHOD FOR DYNAMICALLY PREDICTING AND SUGGESTING EMOJIS FOR MESSAGES

(71) Applicant: TALENT UNLIMITED ONLINE SERVICES PRIVATE LIMITED, Delhi (IN)

(72) Inventors: Ankit Prasad, Gurugram (IN); Rahul Prasad, Gurugram (IN); Kaushik Parashar, New Guwahati (IN)

(73) Assignee: TALENT UNLIMITED ONLINE SERVICES PRIVATE LIMITED, Delhi (IN)

( * ) Notice: Subject to any disclaimer, the term of this patent is extended or adjusted under 35 U.S.C. 154(b) by 0 days.

(21) Appl. No.: 17/352,013

(22) Filed: Jun. 18, 2021

(65) Prior Publication Data
US 2022/0269354 A1    Aug. 25, 2022

(30) Foreign Application Priority Data
Jun. 19, 2020  (IN) .............................. 202011025978

(51) Int. Cl.
| | | |
|---|---|---|
| G06F 3/023 | (2006.01) | |
| G06F 3/04817 | (2022.01) | |
| G06F 3/0482 | (2013.01) | |
| G06F 40/279 | (2020.01) | |
| G06F 40/30 | (2020.01) | |
| H04L 51/04 | (2022.01) | |

(52) U.S. Cl.
CPC .......... *G06F 3/0237* (2013.01); *G06F 3/0482* (2013.01); *G06F 40/279* (2020.01); *G06F 40/30* (2020.01); *H04L 51/04* (2013.01); *G06F 3/04817* (2013.01)

(58) Field of Classification Search
CPC ...... G06F 40/30; G06F 40/279; G06F 3/0237; G06F 3/04817; G06F 3/0482
See application file for complete search history.

(56) References Cited

U.S. PATENT DOCUMENTS

| | | | | |
|---|---|---|---|---|
| 2013/0159919 A1* | 6/2013 | Leydon | ................. | G06F 40/289 715/780 |
| 2014/0088954 A1* | 3/2014 | Shirzadi | ................. | G06F 40/30 704/9 |

(Continued)

*Primary Examiner* — Samuel G Neway
(74) *Attorney, Agent, or Firm* — Joy S Goudie

(57) ABSTRACT

A system including an artificial intelligence (AI) engine and an AI-based method are provided for dynamically predicting and suggesting emojis on a quick access emoji interface. The AI engine detects an input message in an input field on a graphical user interface of a user application. The AI engine processes the input message to identify elements, for example, character elements, image elements, patterns, etc., of the input message. The AI engine analyzes and determines a context and factors, for example, emoji positions, one or more languages, intent, user and global preferences, etc., associated with the input message for each element of the input message. The AI engine dynamically generates predictions of emojis based on the context and one or more factors in real time. The AI engine renders one or more grouped sets of emojis on the emoji interface based on the dynamically generated predictions.

5 Claims, 11 Drawing Sheets

(56) References Cited

U.S. PATENT DOCUMENTS

| | | | |
|---|---|---|---|
| 2015/0100537 A1* | 4/2015 | Grieves | G06N 5/02 706/52 |
| 2016/0004413 A1* | 1/2016 | Leydon | G07F 17/3244 715/838 |
| 2016/0292148 A1* | 10/2016 | Aley | G06F 40/274 |
| 2017/0083506 A1* | 3/2017 | Liu | G06V 40/174 |
| 2017/0185581 A1* | 6/2017 | Bojja | G06V 30/19173 |
| 2017/0344224 A1* | 11/2017 | Kay | G06F 3/0482 |
| 2018/0075343 A1* | 3/2018 | van den Oord | G06N 3/084 |
| 2018/0083898 A1* | 3/2018 | Pham | H04L 51/046 |
| 2018/0336184 A1* | 11/2018 | Bellegarda | G06F 40/30 |
| 2018/0356957 A1* | 12/2018 | Desjardins | H04L 51/04 |
| 2019/0087466 A1* | 3/2019 | Wang | G06F 9/451 |
| 2019/0122403 A1* | 4/2019 | Woo | G06V 10/44 |
| 2019/0122412 A1* | 4/2019 | Woo | H04L 51/52 |
| 2020/0301566 A1* | 9/2020 | Monk | G06F 17/10 |
| 2021/0097137 A1* | 4/2021 | Judd | G06F 40/232 |
| 2022/0004872 A1* | 1/2022 | Raja | G16Y 20/00 |
| 2022/0269354 A1* | 8/2022 | Prasad | G06F 40/30 |

\* cited by examiner

Original input message: It's a lovely day 😍😍😍💧💧💧

Filtered message: It's a lovely day 😍💧

FIG. 2A

Original input message: My lovely wife, 😊😊😊😊😍😍 words cannot describe how special you are to me. I love you more than anything ♡♡and want your birthday🎂🎂🎂🎂 to be the most special day♡♡♡♡

Filtered message: My lovely wife, 😊😍 words cannot describe how special you are to me. I love you more than anything ♡and want your birthday🎂to be the most special day♡

FIG. 2B

Original input message: My lovely wife, 😊😍 words cannot describe how special you are to me. I love you more than anything ♡and want your birthday🎂to be the most special day♡

Indices_list: [ [16,17], [98], [121], [148] ]

FIG. 2C

Please accept this letter as notice of my resignation from my position as a -- ---it is with regret that I submit my letter of resignation as a --------. I intend to work until the end of the month xx/xx/xxxx with my first day being xx/xx/xxxx. I have decided to resign for personal reasons. I would be happy to help with the transition of my duties so that the company continues to function smoothly after my departure. I want to give you my sincere thanks for all the opportunities you have given me and for all of the knowledge I have gained at your company over the months. I'll always be grateful to you for going above and beyond to ensure my success at my position. I never would have been able to secure this new position without all your help and encouragement over my work period.

I request you to please credit my salary on the salary date.

It is my humble request to all. 🙏🙏

Special Thanks

Sudhir Sir 🙂 & Rizwan Sir 🙂

FIG. 3A

🙏, 🙂 and 🙂

FIG. 4 so cute 😍 , So very cute 🥰 , cuttiiee pie ♡

FIG. 5

Emoji mapping: [ 🍕 , 🥧 , 😍 , 🙏 , 😂 ]

| Input Message | Emoji Predictions |
|---|---|
| Excelenttttt | 👌 👍 😍 🥰 💯 |

FIG. 8 superb superb superb amazing [😊]
amazing superb superb [😊, 😊]
superb superb superb [👍, 😊, 🎁]
loved it superb superb superb [😊, 🎁]

FIG. 11 old is gold is back [😄, 🙏, 😊, 😍, 😊]
right old is gold [😄, 🙏, 😊, 😍, 😊]
thanks friend       [😀, ♡, ♡, 😄, 👍]
friend thanks       [😀, ♡, ♡, 😄, 👍]
thanks friend thank [😀, ♡, ♡, 😄, 👍]

FIG.12

ARTIFICIAL INTELLIGENCE-BASED SYSTEM AND METHOD FOR DYNAMICALLY PREDICTING AND SUGGESTING EMOJIS FOR MESSAGES

CROSS-REFERENCE TO RELATED APPLICATIONS

This application claims priority to and the benefit of the non-provisional patent application titled "Artificial Intelligence-Based System and Method for Dynamically Predicting and Suggesting Emojis for Messages", application number 202011025978, filed in the Indian Patent Office on Jun. 19, 2020. The specification of the above referenced patent application is incorporated herein by reference in its entirety.

BACKGROUND

Technical Field

The present invention, in general, relates to message communications. The present invention, in particular, relates to communications using digital pictorial images such as emojis. More particularly, the present invention relates to an artificial intelligence-based system and method for dynamically predicting and suggesting emojis on a quick access emoji interface.

Description of the Related Art

New forms of communication have emerged through social and digital media platforms. Digital pictorial images, for example, ideograms or ideographs such as emojis, pictographs, stickers, etc., have changed the way users of multi-purpose mobile computing devices such as smartphones communicate with each other. Users typically insert digital pictorial images into messages, for example, instant messages, direct messages, chat messages, electronic mail (email) messages, short message service (SMS) text messages, etc. As part of everyday communication, these digital pictorial images project an expression succinctly and are used to convey ideas, nuances, emotions, expressions, and other cues of communication by softening a tone of a message or by emphasizing the message. These digital pictorial images evoke different reactions in different users in different geographical locations across language and cultural diversity. Many social and digital media platforms report an exchange of millions of emojis everyday through various user applications such as messaging applications, email applications, chat platforms, gaming applications, etc.

Digital pictorial images insert tone, expression, and body language into a message, which would otherwise be mere, plain text. However, users who wish to communicate through emojis are restricted to selecting emojis from a limited set of emojis through inconvenient layouts provided by a user application or an input interface. These layouts for selecting desired emojis from a limited set of emojis are difficult to access and most often require additional add-on components. If a user wants to share one or more emojis over a user application, for example, a messaging application, the user has to switch to an emoji layout and search for a desired emoji which is time consuming and requires effort to identify a suitable emoji, thereby impacting the user's communication experience. Moreover, most emoji services do not display emojis in a quickly accessible interface for selection based on a context of an input message. Furthermore, most emoji services do not account for a mixture of languages, that is, macaronic languages, that users may use to communicate their messages.

Hence, there is a long-felt need for an artificial intelligence-based system and method for dynamically predicting and suggesting emojis on a quick access emoji interface based on multiple factors, such as, context of an input message, one or more languages used to communicate the input message, etc., in real time.

The above-mentioned shortcomings, disadvantages and problems are addressed herein, and which will be understood by reading and studying the following specification.

OBJECTS OF THE EMBODIMENTS HEREIN

An object of the present invention is to develop an artificial intelligence-based system and method for dynamically predicting and suggesting digital pictorial images, such as, emojis, on a quick access pictorial image interface, herein exemplarily referred to as a "quick access emoji interface", in real time.

Another object of the present invention is to dynamically predict and generate emoji suggestions based on a plurality of factors, such as an input message entered by a user in an input field provided by a user application, context of the input message, a location of the input message, positions of the emojis in the input message, one or more languages of the input message, intent of the input message, user preferences, global preferences, etc., in real time using artificial intelligence (AI).

Yet another object of the present invention is to provide a quick access emoji interface for displaying predictions and suggestions of emojis in a conveniently accessible and switchable location on an input interface.

Yet another object of the present invention is to render emojis related to the context and/or intent of an input message, most sent emojis, recently used emojis, and top globally used emojis in a dynamically configurable order on the quick access emoji interface.

Yet another object of the present invention is to render emoji suggestions as a user starts entering a message in the input field provided by a user application for convenient replacement of a word with a desired emoji.

The objects disclosed above will be realized and achieved at least by the elements, features, and combinations particularly pointed out in the detailed description of the present invention. The objects disclosed above have outlined, rather broadly, the features of the present invention in order that the detailed description that follows may be better understood. The objects disclosed above are not intended to determine the scope of the claimed subject matter and are not to be construed as limiting of the present invention. Additional objects, features, and advantages of the present invention are disclosed below. The objects disclosed above, which are believed to be characteristic of the present invention, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The present invention discloses a system for dynamically predicting and suggesting digital pictorial images on a quick access pictorial image interface, the system comprises an electronic device comprising an input device, at least one processor, a memory unit operably and communicatively coupled to the at least one processor, and a display unit.

The system further comprises a sensing unit comprising one or more of a plurality of sensors and operably coupled to the at least one processor of the electronic device. Furthermore, the system comprises an engine operably coupled to the sensing unit, the at least one processor, and a messaging application deployed on the electronic device. The engine is configured to identify a plurality of elements of an input message of a user on the messaging application, determine a context of the input message for each of the identified plurality of elements of the input message, analyze a plurality of factors associated with the input message for each of the identified plurality elements, and dynamically generate prediction of an emoji based on the determined context and the analyzed plurality of factors associated with the input message.

The present invention discloses an artificial intelligence-based system and method for dynamically predicting and suggesting digital pictorial images, for example, emojis, on a quick access pictorial image interface, herein exemplarily referred to as a "quick access emoji interface", in real time. Moreover, the present invention employs an artificial intelligence (AI) engine configured to execute one or more AI algorithms for dynamically predicting and generating emoji suggestions based on a plurality of factors, for example, an input message entered by a user in an input field provided by a user application, context of the input message, location of the input message, positions of the emojis in the input message, one or more languages of the input message, intent of the input message, user preferences, global preferences, etc., in real time.

The AI engine detects an input message in an input field provided on a graphical user interface (GUI) of a user application. The AI engine processes the input message to identify a plurality of elements of the input message. The elements of the input message comprise, character elements, grammatical elements, numeric elements, image elements, line break elements, space elements, patterns, etc. The AI engine analyses and determines a context and a plurality of factors associated with the input message for each of the identified elements of the input message. The factors associated with the input message comprise, a location of the input message, positions of the emojis in the input message, one or more languages of the input message, intent of the input message, user preferences, global preferences, etc. The languages comprise individual languages and a mixture of any two or more of the individual languages, also referred to as "macaronic languages". The AI engine dynamically generates predictions of emojis based on the determined context and one or more of the factors in real time.

The AI engine renders one or more grouped sets of the emojis on the quick access emoji interface based on the dynamically generated predictions. In an embodiment, the grouped sets of emojis comprise, most sent emojis, recently sent emojis, and remaining global emojis.

The AI engine renders emojis related to the context and/or the intent of the input message, most sent emojis, recently used emojis, and top globally used emojis in a dynamically configurable order on the quick access emoji interface. Furthermore, the AI engine renders the emoji suggestions as a user starts entering a message in the input field provided by the user application for convenient replacement of a word with a desired emoji.

According to an embodiment, the quick access emoji interface is positioned proximal to the input field in a switchable location on an input interface, such as, a touch-enabled keyboard interface, of an electronic device. The quick access emoji interface displays predictions and suggestions of emojis in a conveniently accessible and switchable location on the input interface. According to an embodiment, the AI engine renders preconfigured grouped sets of emojis on the quick access emoji interface, when the input message is not detected in the input field of the user application.

According to an embodiment, the related systems comprise circuitry and/or programming instructions for executing the method disclosed in the present invention. According to an embodiment, the circuitry and/or programming instructions are any one of a combination of hardware, software, and/or firmware configured to implement the present invention depending upon the design choices of a system designer. According to an embodiment, various structural elements are employed depending on the design choices of the system designer.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing summary, as well as the following detailed description, is better understood when read in conjunction with the appended drawings. For illustrating the present invention, exemplary constructions of the present invention are shown in the drawings. However, the present invention is not limited to the specific methods and components disclosed herein. The description of a method step or a component referenced by a numeral in a drawing is applicable to the description of that method step or component shown by that same numeral in any subsequent drawing herein.

The other objects, features and advantages will occur to those skilled in the art from the following description of the preferred embodiment and the accompanying drawings in which:

FIGS. 2A-2C illustrate examples of messages processed by an artificial intelligence (AI) engine for training an AI model executable for dynamically predicting and suggesting emojis on a quick access emoji interface, according to an embodiment of the present invention.

FIGS. 3A-3B illustrate an example of a message and corresponding emojis processed by the AI engine for determining context of the message during training of the AI model, according to an embodiment of the present invention.

FIG. 4 illustrates another example of a message processed by the AI engine for determining context of the message during training of the AI model, according to an embodiment of the present invention.

FIGS. 5-7 illustrate examples of messages and emojis processed by the AI engine for mapping the emojis to the messages, according to an embodiment of the present invention.

FIG. 8 illustrates a tabular representation showing emoji predictions dynamically generated by the AI engine for corresponding messages, according to an embodiment of the present invention.

FIGS. 11-12 illustrate examples of mappings of sentences to clusters of emojis, generated by the AI engine, according to an embodiment of the present invention.

Figure 1:
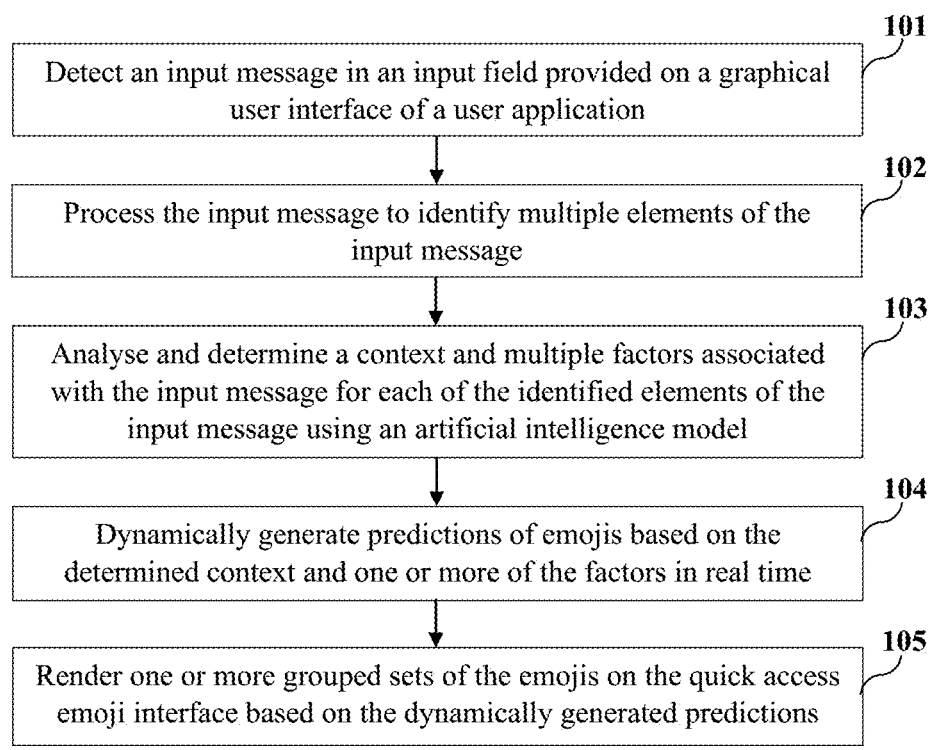
FIG. 1 illustrates a flowchart of an artificial intelligence-based method for dynamically predicting and suggesting digital pictorial images on a quick access pictorial image interface in real time, according to an embodiment of the present invention.

Although the specific features of the present invention are shown in some drawings and not in others. This is done for convenience only as each feature may be combined with any or all of the other features in accordance with the present invention.

DETAILED DESCRIPTION

The detailed description of various exemplary embodiments of the disclosure is described herein with reference to the accompanying drawings. It should be noted that the embodiments are described herein in such details as to clearly communicate the disclosure. However, the details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail below. It should be understood however, it is not intended to limit the disclosure to the forms disclosed, but on the contrary, the disclosure is to cover all modifications, equivalents, and alternatives falling within the scope of the disclosure.

The present invention discloses an artificial intelligence-based system and method for dynamically predicting and suggesting digital pictorial images, for example, emojis, on a quick access pictorial image interface, herein exemplarily referred to as a "quick access emoji interface", in real time. Moreover, the present invention employs an artificial intelligence (AI) engine configured to execute one or more AI algorithms for dynamically predicting and generating emoji suggestions based on a plurality of factors, for example, an input message entered by a user in an input field provided by a user application, context of the input message, location of the input message, positions of the emojis in the input message, one or more languages of the input message, intent of the input message, user preferences, global preferences, etc., in real time.

The AI engine detects an input message in an input field provided on a graphical user interface (GUI) of a user application. The AI engine processes the input message to identify a plurality of elements of the input message. In one embodiment, the elements of the input message comprise, character elements, grammatical elements, numeric elements, image elements, line break elements, space elements, patterns, etc. The AI engine analyses and determines a context and a plurality of factors associated with the input message for each of the identified elements of the input message. The factors associated with the input message comprise, a location of the input message, positions of the emojis in the input message, one or more languages of the input message, intent of the input message, user preferences, global preferences, etc. The languages comprise individual languages and a mixture of any two or more of the individual languages, also referred to as "macaronic languages". The AI engine dynamically generates predictions of emojis based on the determined context and one or more of the factors in real time.

The AI engine renders at least one of an emoji, or a group of emojis, or one or more grouped sets of the emojis on the quick access emoji interface based on the dynamically generated predictions. The AI engine suggests the grouped sets of emojis based on the context of the input message. In an embodiment, the grouped sets of emojis comprise, most sent emojis, recently sent emojis, and remaining global emojis. The AI engine renders emojis related to the context and/or the intent of the input message, most sent emojis, recently used emojis, and top globally used emojis in a dynamically configurable order on the quick access emoji interface. Furthermore, the AI engine renders the emoji suggestions as a user starts entering a message in the input field provided by the user application for convenient replacement of a word with a desired emoji.

According to an embodiment, the quick access emoji interface is positioned proximal to the input field in a switchable location on an input interface, such as, a touch-enabled keyboard interface, of an electronic device. The quick access emoji interface displays predictions and suggestions of emojis in a conveniently accessible and switchable location on the input interface. According to an embodiment, the AI engine renders preconfigured grouped sets of emojis on the quick access emoji interface, when the input message is not detected in the input field of the user application.

FIG. 1 illustrates a flowchart of an artificial intelligence-based method for dynamically predicting and suggesting digital pictorial images on a quick access pictorial image interface in real time, according to an embodiment of the present invention. As used herein, "digital pictorial image" refers to a digital image comprising one or more graphical symbols that graphically and pictorially represent, for example, an idea, a concept, a product, and/or a service. The digital pictorial image is, for example, an ideogram, an ideograph, or a pictogram such as an emoji or a smiley. In an embodiment, the digital pictorial image is a product image. For purposes of illustration, the detailed description refers to the digital pictorial images being emojis rendered on a quick access emoji interface; however, the scope of the method and the system disclosed herein is not limited to dynamically predicting and suggesting emojis on the quick access emoji interface but may be extended to dynamically predicting and suggesting any digital pictorial image on a quick access pictorial image interface.

The method disclosed herein employs an artificial intelligence (AI) engine configured to execute one or more AI algorithms for dynamically predicting and suggesting digital pictorial images on a quick access pictorial image interface in real time. The AI engine includes a model which is trained based on a collection of data. In one embodiment, the collection of data includes chat data comprising latin characters. The chat data of latin characters includes at least one emoji per sentence of input message. In one example, the sentence includes at least five words.

The AI engine detects 101 an input message in an input field provided on a graphical user interface (GUI) of a user application. The user application is, for example, a messaging application, a business communication application, an electronic commerce (e-commerce) application, an electronic mail (email) application, a gaining application, a media application, etc., deployed on an electronic device. In an embodiment, the user application is operably coupled to the AI engine. The AI engine processes 102 the input message to identify multiple elements of the input message. The elements of the input message comprise, for example, character elements, grammatical elements, numeric elements, image elements, line break elements, space elements, patterns, etc. The AI engine analyses and determines 103 a context and multiple factors associated with the input message for each of the identified elements of the input message using an AI model. The factors associated with the input message comprise, for example, a location of the input message, one or more languages of the input message, intent of the input message, user preferences, global preferences, etc. The languages comprise, for example, individual languages and a mixture of any two or more of the individual languages, also referred to as "macaronic languages". The AI engine dynamically generates 104 predictions of emojis based on the determined context and one or more of the factors in real time.

Figure 14:
FIG. 14 illustrates a graphical user interface displayed on a display unit of an electronic device, showing a rendering of emoji suggestions on a quick access emoji interface, according to an embodiment of the present invention.

The AI engine renders 105 one or more grouped sets of the emojis on the quick access emoji interface based on the dynamically generated predictions. In an embodiment, the grouped sets of emojis comprise, for example, most sent emojis, recently sent emojis, and remaining global emojis. In an embodiment, the AI engine renders emojis related to the context and/or the intent of the input message, most sent emojis, recently used emojis, and top globally used emojis in a dynamically configurable order on the quick access emoji interface. Furthermore, in an embodiment, the AI engine renders the emoji suggestions as a user starts entering a message in the input field provided by the user application for the user to conveniently replace a word with a desired emoji. Additionally, the AI engine renders the emoji suggestions as a user starts entering the message in the input field provided by the user application for the user to conveniently add the desired emoji. In an embodiment, the quick access emoji interface is positioned proximal to the input field in a switchable location on an input interface, for example, a touch-enabled keyboard interface of an electronic device as illustrated in FIG. 14. The quick access emoji interface displays predictions and suggestions of emojis in a conveniently accessible and switchable location on the input interface. In an embodiment when the input message in not detected in the input field of the user application, the AI engine renders preconfigured grouped sets of emojis on the quick access emoji interface.

FIGS. 2A-FIG. 7 illustrate examples of chat data processed by the AI engine for training the AI model executable for dynamically predicting and suggesting emojis on a quick access emoji interface in real time. In an embodiment, the AI engine executes an AI algorithm developed from an AI model comprising, for example, an embedding layer, two one-dimensional convolutional neural network layers, that is, Conv1D layers, batch normalization layers, a sigmoid activation layer, and a dense layer. In an embodiment, the AI model is developed using a neural network library, for example, Keras, and is configured to operate on a machine learning platform, for example, a TensorFlow platform in the backend. The AI engine initiates the process by gathering data, for example, message data or chat data comprising elements such as Latin characters with at least one emoji per sentence or per message or chat and special characters. The chat data comprises characters to be sanitized in a data sanitizing pipeline. The AI engine extracts text, that is, a large number of sentences, for example, about 300,000 sentences, from the message data and stores the sentences in a data file format, for example, a comma separated values (CSV) file format of, for example, about 3 gigabytes (GB) data.

In an embodiment, the AI engine executes a data sanitisation pipeline and natural language processing (NLP) for managing the extracted text as follows. The AI engine sanitises the extracted text, for example, by removing the special characters except predefined punctuations, for example, [ .,!'? and space] from the extracted text and by removing all characters outside a-z, A-Z, and 0-9 from the extracted text. The AI engine removes other elements, for example, line breaks, variation selectors, control characters or non-printing characters, etc., from the extracted text. The AI engine discards text that is not accompanied by an emoji positioned at any location, for example, start, middle, or end of the text. The AI engine collapses or filters multiple allowed punctuations to a single occurrence. For example, the AI engine filters "!!!!" to "!". In an embodiment, the AI engine executes regular expression (regex) patterns in the extracted text to filter multiple character occurrences, for example, to two occurrences. In one embodiment, the AI engine executes a regex pattern to identify a repeating pattern and replace the repeating pattern with a single pattern appearance. Moreover, the AI engine masks any number present in the extracted text. Furthermore, the AI engine collapses or filters multiple spaces to a single space and strips leading and trailing spaces.

Further, the training of the AI model includes sanitisation and grouping of emojis to obtain filtered texts. FIGS. 2A-2C illustrate examples of messages processed by the AI engine for training an AI model executable for dynamically predicting and suggesting emojis on the quick access emoji interface, according to an embodiment of the present invention. The AI engine processes the chat data containing one or more emojis with reference to a predetermined list of emojis. In an embodiment, if the emojis in the chat data include a skin shade, the AI engine removes the skin shade of each emoji to convert the emoji into a neutral shade. The AI engine filters emojis that are outside the predetermined list of emojis. Furthermore, the AI engine filters multiple appearances of the same emoji at an instance to a single appearance as illustrated in FIG. 2A. As emojis may be positioned at any location in the chat data, the AI engine collapses or filters the emojis positionally as illustrated in FIG. 2B, to aid in a subsequent context extraction associated with each emoji. The AI engine maintains the positional grouping of the emojis and stores indices of these emoji groupings in an array as illustrated in FIG. 2C. The group of indices helps the AI engine to map context of the input message to the emoji present and maps the corresponding text to each emoji respectively of the group under consideration.

Furthermore, the training of the AI model includes extraction of context the AI engine extracts context from the chat data and/or the filtered message. FIGS. 3A-3B illustrate an example of a message from the chat data and corresponding emojis that are processed by the AI engine for determining context of the message during training of the AI model, according to an embodiment of the present invention. In one example, to obtain the context of the message the AI engine extracts 60 characters from the message before the usage of the emoji and 60 characters after the usage of the emoji or an emoji group based on a pattern of a user's usage of emojis in the gathered message data. In the example message, the user has typed the message in a macaronic language, for example, Hinglish, that is a mixture of two individual languages, namely, Hindi and English, as illustrated in FIG. 3A. The AI engine determines that the emojis used have context in the nearest 5-6 words and not in the entire long message illustrated in FIG. 3A, which indicates that users have a habit of using an emoji after typing 5-6 words on an average. Based on this example, the AI engine, therefore, is configured to extract 60 characters before and after an emoji occurred in the message and then map this 60-character text to groups of emojis, for example, the three emoji group illustrated in FIG. 3B. In one embodiment, the emoji group of emojis are extracted from the message after filtering the repeated emojis. As a result, the AI model is trained based on the understanding that the same text is mapped to different emojis, which indicates that a user may use different emojis to express the same emotion, thereby aiding the AI model to learn and predict what emojis are possible for the same text or message expressed. In the current example, the AI engine further determines that maximum users typed a text of 5-6 words or 50-70 characters in length before using an emoji as validated by histograms plotted for an average sentence length or an average character length of the text in the message data in FIGS. 10A-10B.

The AI model was trained to map the text of maximum 60-character length mapped to an emoji. In the above example, the the AI engine maps 60-character string to the extracted group of emojis that are extracted from the message. Alternatively, if the extracted group has only one emoji, then the AI engine maps each such 60-character string to that one emoji. The AI engine increases data points by implementing the above technique.

In an embodiment, the AI engine disallows the text from having more than 50% spaces and more than 60% usage of punctuations. FIG. 4 illustrates another example of a message processed by the AI engine for determining context of the message during training of the AI model, according to an embodiment of the present invention. In the message illustrated in FIG. 4, the text comprises only 5 Latin characters and the remaining characters are either spaces or punctuations. As this type of data point does not convey any context and may be misinterpreted by the AI model, the AI engine filters this data point out during preparation of a dataset. The AI engine generates, for example, a list of texts of maximum 60-character length and minimum 2-character length mapped to an emoji from the considered list of emojis. The AI engine stores the generated list, for example, in a text column in a CSV file format.

In an embodiment, the AI model training further includes a process of clustering similar sentence to ensure similar context sentences map to one class of emojis. In this embodiment, to map a single text data point to a variety of emojis used by different users, the AI engine ensures that sentences of a similar context map to one class of emojis. Consider an example where three sentences that have the same context are mapped to three different emojis as illustrated in FIG. 5. To avoid misinterpretation of the context and the emoji from the example illustrated in FIG. 5 and to extract the context captured with a correct emoji mapping, the AI engine clusters and maps all the sentences with a similarity of a preconfigured threshold and above to the same group of most frequently used emojis in that cluster. To generate the correct context-emoji mapping, in an embodiment, the AI engine implements word vectors training on the AI model, for example, using a fastText tool. These vectors capture hidden information about a language such as word analogies or semantics and improves performance of text classifiers. In an embodiment, the AI engine executes the fast Text model to perform unsupervised training on the gathered message data with emojis and other special characters removed, retaining only one sentence per line. The fast Text model is trained, for example, for 100 epochs with a minimum word occurrence frequency of 10 and an embedding dimension of 100. The AI engine then forms a sentence vector using the word vectors by computing an average of all the vectors fetched, that is, one vector for each word, for a sentence, and dividing the average by the number of words present.

In an embodiment, the AI engine employs a library for learning of word embeddings and text classification, for example, the fastText tool, to train word vectors because, instead of learning vectors for words directly, the fastText tool represents each word as an n-gram of characters. For example, for the word "artificial" with n=3, the fastText representation of this word is <ar, art, rti, tif, ifi, fic, ici, ial, al>, where the angular brackets indicate the beginning and end of the word. This library aids in capturing the meaning of shorter words and allows the embeddings to understand suffixes and prefixes. Once the word has been represented using character n-grams, a skip-gram model is trained to learn the embeddings. This model is a bag-of-words model with a sliding window over a word because no internal structure of the word is considered. If the characters are within this sliding window, the order of the n-grams is inconsequential. The AI engine employs the above disclosed library for rare words. Therefore, even if a word was not part of the training dataset, the word can be broken down into n-grams to obtain its embeddings. The AI model, therefore, learns the granular meaning and attempts to generate predictions on any new data. The AI-based system and method disclosed herein do not rely on pre-loaded files, maps, tables, etc., for suggesting an emoji for the input message entered in an input field by the user. The AI engine implements a complete deep learning-based model that is trained, for example, on 20 million data points. More data may be provided to the AI model to allow the AI model to learn more and generate emoji predictions with increased accuracy.

In an embodiment, the AI engine clusters similar sentences using a programming language library, for example, an Approximate Nearest Neighbors Oh Yeah (ANNOY) library. The ANNOY library is a C++ library with Python bindings to search for points in space that are close to a given query point. Using the ANNOY library, the AI engine generates a forest of trees that stores, index wise, the sentences found similar using the sentence vector given. For a query sentence given, the AI engine generates a list of k similar sentences and their index position in the dataset. Depending on the extent of angular distance between the query sentence and the similar sentences, the AI engine configures a threshold to collect a number of sentences that fulfills the threshold criterion in the dataset. The AI engine then maps the clusters of sentences, for example, to the most frequent 5 topmost emojis in that cluster. In an example, the AI engine maps a minimum of one emoji and a maximum of 5 emojis to the similar cluster formed depending on the threshold. In an example, for a query sentence "happy birthday", the AI engine generates the following clusters:

| Similar sentences | Angular distance |
|---|---|
| birthday happy | 0.0 |
| happy birthday happy birthday | 0.0 |
| birthday happy birthday happy | 0.0 |
| happy birthday happy birthday yarr | 0.14156264066696167 |
| happy birthday happy birthday hap | 0.15268754959106445 |
| happy happy wala birthday birtha | 0.16257968544960022 |
| happy birthday maa happy birthday | 0.17669659852981567 |

The AI engine maps the entire cluster shown in the table above to the emoji mapping illustrated in FIG. 6. The AI engine, therefore, maps the similar context in sentences to the same emoji vector. In an embodiment, the AI engine trains the AI model to understand that such context can be mapped to the emojis exemplarily illustrated in FIG. 6, and not to each one of the emojis as a different class, but as different labels. In an embodiment, the AI engine performs multi-label classification where each text belongs to a single emoji or to several emojis.

In one embodiment, based on the filtered data, the AI engine forms a forest of trees(using the ANNOY) that stores index vise the sentences. The sentences are found similar using the sentence vector. In one embodiment, the AI engine receives a query sentence, the query sentence gives a list of k similar sentences and the index position in the dataset. In one embodiment, depending on the extent of angular distance between the query sentence and the similar sentences, the AI engine decides a threshold to collect as many sentences that fulfill the threshold criterion in the dataset. In one embodiment, the AI engine maps the clusters of sentences to the most frequent topmost emojis in that cluster. For example, the most frequent topmost are 5 emojis, however, at times there may be less than 5 emojis in some instances. Therefore, a minimum of one emoji and maximum of 5 emojis are being mapped to the similar cluster formed depending on the threshold. In one embodiment, the AI engine trains the model on this data and reports an improved accuracy metric from the algorithm. For example, the metric improved 73.4% and with visible subjective relevance.

In another example, the AI engine generates a character-based model with a vocabulary of 30 characters including 26 characters, that is, a-z, and 4 special characters including a space. In an embodiment, the AI engine converts all characters to lowercase letters before processing the characters. In this example, the character-based model contains the following vocabulary: {'b': 0, 'e': 1, 's': 2, 't': 3, ' ':4 . . . }. The AI engine converts sentences, for example, to a vector of shape (1,60) having numbers appended in place of the character. The AI engine also converts the emoji clusters to an array of ones at the indices where the emoji is located and zeros where that particular emoji is not located. The emoji vector shape is, for example, (1,65). The AI engine performs index mapping using a fixed emoji-index mapping dictionary as illustrated in FIG. 7. In an embodiment, the AI engine executes one-hot encoding to generate a multi one-hot encoded representation with the following exemplary X_train and Y_train data:

| Sentence | Emoji_label |
|---|---|
| [0, 1, 2, 2, 1, 3, 3, 3, 3, 3, 3, 3, 3, 3, 3, 3, . . . | [1.0, 0.0, 0.0, 0.0, 0.0, 0.0, 0.0, 0.0, 1.0, . . . |

In an embodiment, the AI-based system and method disclosed herein develops an AI model, for example, using Conv1D layers to train for a multi-label classification task. The AI model comprises, for example, two Conv1D layers along with batch-normalization layers and a parametric rectified linear unit (PReLU). The AI engine trains the AI model till a training loss converges to an optimum point. The AI model generates probabilities of all the considered emojis. In an example, the top 5 emojis are considered as relevant predictions from the AI model.

In the AI-based method disclosed herein, in one embodiment, the training data for training the AI model is prepared as follows. Preparation of training, test and validation datasets is performed on sentences with emoji mapping by changing these data points or texts to an array of numbers representing each character. The fastText model is a library for efficient learning of word representations and sentence classification. In one embodiment, the AI engine utilizes sub-word-level information to build vectors. In one embodiment, the sub-word-level handles out-of-vocabulary words and map the out-of-vocabulary words with the nearest word vector. That is, in one embodiment, the AI engine generates a character-based model where the vocabulary comprises all the characters present in the dataset. The AI engine creates a corpora and trains the corpora using the fastText model to develop the vocabulary for words and the corresponding nearest emojis. For example, the AI engine creates the corpora of about 500 lac sentences, with one sentence per line and at least one emoji per sentence. The data created assist in retaining the positional context of the emoji intact. Further, as per the example, the sentences are extracted by first detecting the position of the emojis and then extract 60 characters around it. The assumption states that the nearest 60 characters have words that are most relevantly mapped to emojis. Few examples of the sentences are: 'many many returns of the day  happy wala birthday bhai', 'hm aise karenge v nhi bt dhokhebaaz pad lena by', 'lovelly nyc dear', and 'waah khoobsurat performance shandaar singing'.

In one embodiment, the trained AI model of the AI engine maps the context of the input message to a cluster of emojis. The few or all of the mapped cluster of emojis are displayed on the user interface. For example, the AI engine trains the AI model based on the vocabulary for words that may include emoji and corresponding context of words of may include 'love', 'forever', 'mahi', 'dil', 'jahan', 'jaan', 'nd', 'lovehappy', 'mahh', 'lifeline', 'family', 'alott', 'kitkat', 'my', 'showers', 'mylove' and the like. The AI engine identifies multiple nearest words (for example 100 words) to emoji  in the corpus and a dictionary is created with the words. Further, the AI engine creates a pipeline for filtering the corpus to contain sentences with at least a single word from the dictionary and correctly mapped to the corresponding emoji. For example, the emoji  had very few occurrences, but based on accurate identification of the correct context of the word and corresponding emoji and with the use of augmentation, it was possible to scale up such kind of data points, so that model will be able to generalize. Based on the above training, the AI model of the AI engine clusters emojis using the strategy of mapping similar emojis based on the context of the corresponding words.

FIG. 8 illustrates a tabular representation showing emoji predictions dynamically generated by the AI engine for corresponding messages, according to an embodiment of the present invention. The AI engine executes the AI algorithm developed from the trained AI model as disclosed above for dynamically predicting and suggesting emojis on a quick access emoji interface based on one or more languages used in an input message. The trained AI model is configured to develop a semantic understanding for a language that has no grammar rules, no defined vocabulary, and no clear distinction between stop words and normal words. The trained AI model, therefore, understands messages in macaronic languages, for example, Hindi mixed with English, where Hindi words are entered in an input field using a Latin script.

The AI algorithm developed from the trained AI model disclosed above does not need any prestored data structure or mapping. The AI engine executes the AI algorithm to generate real-time predictions even for out-of-vocabulary situations. If an entirely new word or a sequence of words is entered in an input field by a user, due to the character-based nature of the AI model disclosed herein, the AI engine attempts to find and match the current sequence of letters with any nearest pattern on which the AI model has been trained. The AI engine does not need to perform a lookup of a hash table where words are mapped to specific emojis. In an embodiment, the AI engine develops the AI model using machine learning, TensorFlow-Keras layers, and trains the AI model on a bulk of data to generate predictions for the input message entered in the input field by the user.

Figure 9:
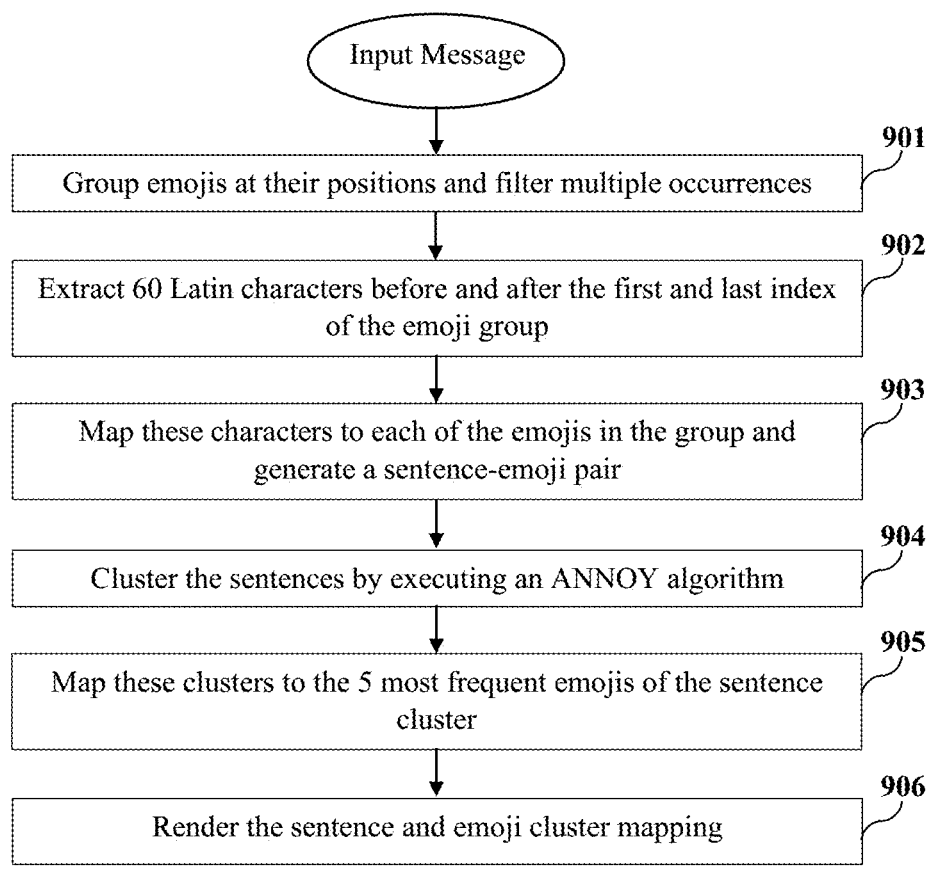
FIG. 9 illustrates a high-level flowchart of an AI-based method for mapping an input message to an emoji, according to an embodiment of the present invention.

FIG. 9 illustrates a high-level flowchart of an AI-based method for mapping an input message to an emoji, according to an embodiment of the present invention. In the method disclosed herein, the AI engine groups 901 emojis at their positions and filters multiple occurrences of the emojis. The AI engine extracts 902 a predetermined number of Latin characters, for example. 60 Latin characters, before and after the first and last index of the emoji group. The AI engine maps 903 these characters to each of the emojis in the group and generates a sentence-emoji pair. In an embodiment, the AI engine clusters 904 the sentences by executing an Approximate Nearest Neighbors Oh Yeah (ANNOY) algorithm. The AI engine maps 905 these clusters to a predefined number of emojis, for example, the 5 most frequent emojis, of the sentence cluster. The AI engine then renders 906 the sentence and emoji cluster mapping for generating and displaying the emoji suggestions on a quick access emoji interface. The flowchart in FIG. 9 exemplarily illustrates extraction of the context based on processing 60 characters near an emoji. Users typically enter an emoji after typing 3 to 5 words with an average character length of 60 as shown in the histograms illustrated in FIGS. 10A-10B.

Figure 10A:
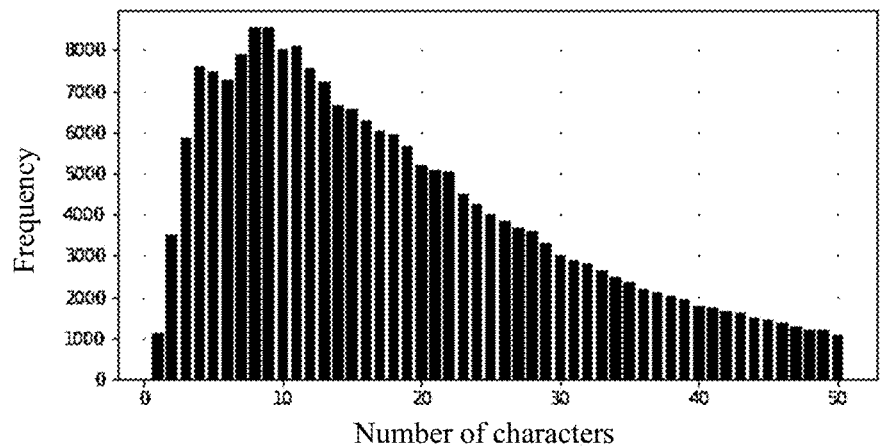
FIGS. 10A-10B illustrate histograms of number of characters and words per sentence of an input message processed by the AI engine, according to an embodiment of the present invention.
Figure 10B:
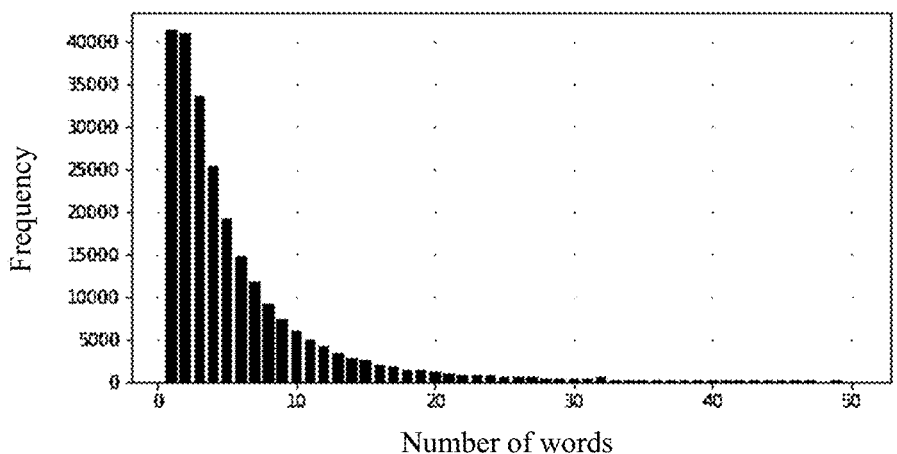

FIGS. 10A-10B illustrate histograms of number of characters and words per sentence of an input message processed by the AI engine, according to an embodiment of the present invention. The histogram illustrated in FIG. 10A plots the number of characters per sentence frequency, while the histogram illustrated in FIG. 10B plots the number of words per sentence frequency. The histograms illustrated in FIGS. 10A-10B are plotted based on the message data extracted for training the AI model. In an example, the AI engine restricts the number of characters to 60 and maps these 60 characters to an emoji cluster according to the context extracted as disclosed in the detailed description of FIG. 9. In an embodiment, the AI-based system and method disclosed herein develop multi-label classification because different users can map some contextual sentences to different labels, which are also similar to each other as illustrated in FIG. 11.

FIGS. 11-12 illustrate examples of mappings of sentences to clusters of emojis, generated by the AI engine, according to an embodiment of the present invention. Examples of sentences post clustering and their mapped emoji clusters are illustrated in FIG. 12. The AI engine configures the AI model to view the same labels provided to contextually the same sentences so that the AI model learns to map a context to a fixed vector of labels and not misinterpret a variety of labels for the same context. In the AI-based method disclosed herein, the AI engine finalizes the labels after finding, for example, the top 5 emojis occurring in that particular cluster of similar sentences. As illustrated in FIG. 12, the AI engine maps similar context inputs to the exact same emoji cluster, thereby ensuring multi-label classification.

Figure 13A:
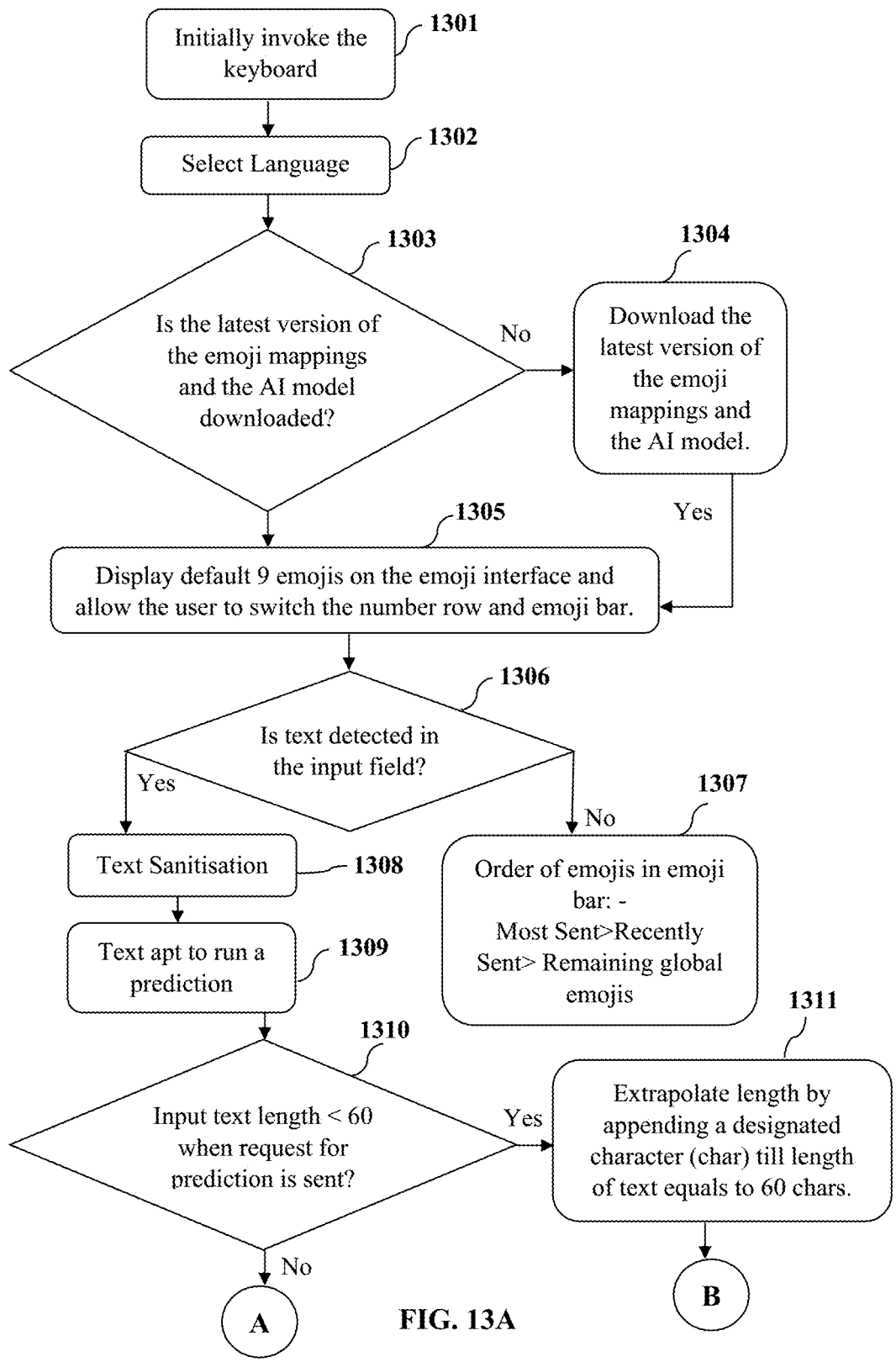
FIGS. 13A-13B illustrate a flowchart of an AI-based method for dynamically predicting and suggesting emojis on a quick access emoji interface based on one or more languages used in an input message, according to an embodiment of the present invention.
Figure 13B:
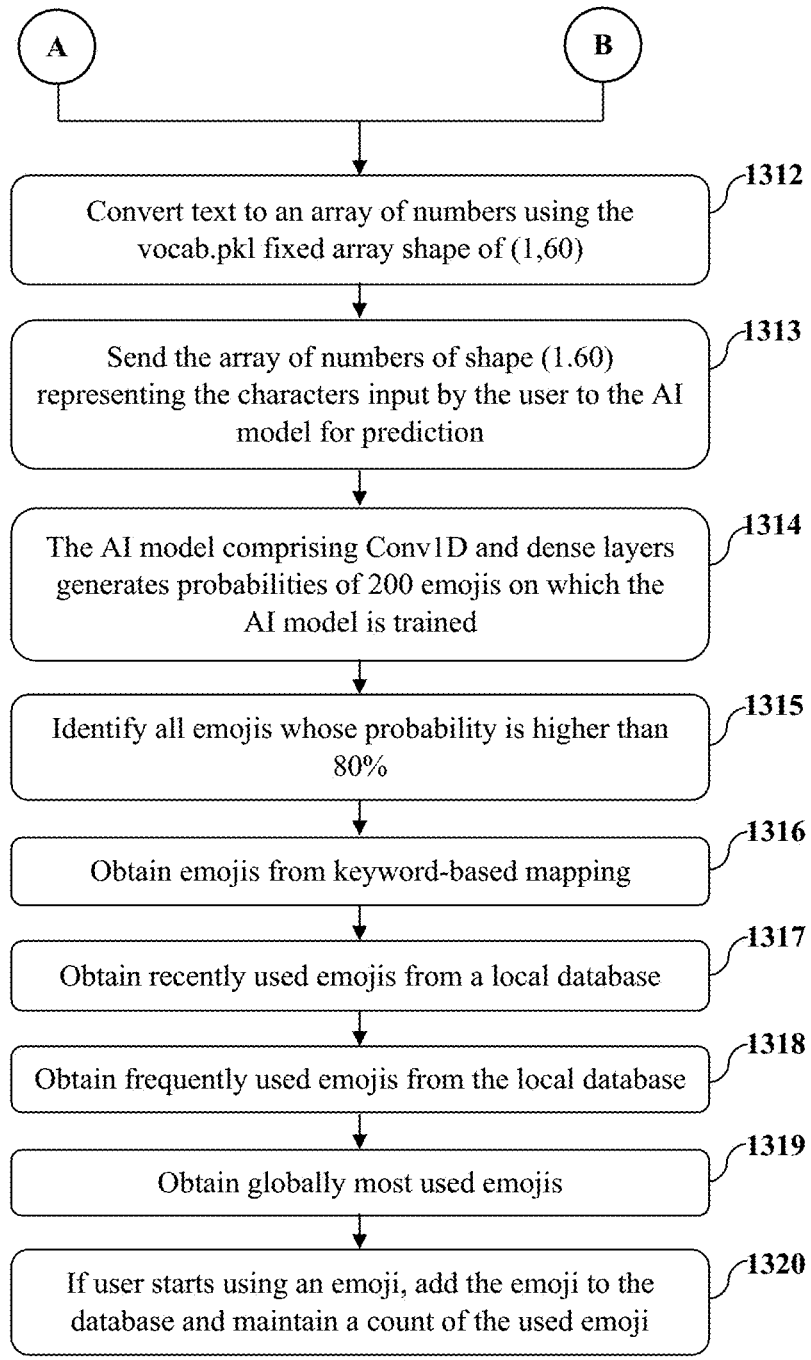

FIGS. 13A-13B illustrate a flowchart of an AI-based method for dynamically predicting and suggesting emojis on a quick access emoji interface based on one or more languages used in an input message, according to an embodiment of the present invention. The process initiates 1301 when a user invokes an input interface, for example, a touch-enabled keyboard interface, for entering a message into a user application, for example, a chat application or a messaging application deployed on an electronic device, for example, a smartphone. The keyboard interface is invoked with a default language, for example, English, and associated data and files required by the AI engine are downloaded from a server via a network. The AI engine allows the user to select 1302 a language of their choice, for example, an Indian script (inscript) language or a macaronic language. The AI engine determines 1303 whether a current version of the emoji mappings and the AI model for the selected language is downloaded to a data storage device of the electronic device. If the emoji mappings and the AI model for the selected language are not downloaded, then the AI engine downloads 1304 the latest version of the emoji mappings and the AI model from the server to the data storage device of the electronic device. The AI engine displays 1305 a predetermined number of emojis, for example, the top 9 globally most used emojis by default in a quick access emoji interface, also referred to as an "emoji bar", positioned in a row of the keyboard interface. If a number row is displayed on the keyboard interface, the AI engine allows the user to switch to the quick access emoji interface as per the requirements of the user. When a user starts typing text in an input field provided by the user application, the AI engine dynamically predicts the emoji based on the character mapping using the AI model trained as disclosed above.

The AI engine, in communication with a sensing unit of the electronic device, detects 1306 whether text is entered in the input field. If there is no text in the input field, the AI engine renders 1307 the emojis in the following example order on the emoji bar: Most sent>Recently sent>Remaining global emojis. If the AI engine detects text in the input field, the AI engine executes the following AI algorithm defined by the trained AI model for dynamically predicting and suggesting emojis on the emoji bar. The AI engine sanitises 1308 the detected text, for example, by removing all special characters except a predefined number of punctuations, for example, [.,!'? and space] and by removing all characters outside a-z, A-Z, and 0-9. The AI engine then removes line breaks, variation selectors, and control characters. The AI engine then filters multiple allowed punctuations to a single occurrence. For example, the AI engine filters "!!!!" to "!". The AI engine then filters multiple character occurrences to two occurrences. The AI engine then identifies a repeating pattern and replaces the repeating pattern with a single pattern appearance. The AI engine also masks any numbers present in the text. Furthermore, the AI engine filters multiple spaces to a single space and strips leading and trailing spaces.

After the text is sanitized, the text is ready or apt 1309 for further processing by the AI model. In an example, the AI engine determines 1310 whether the input text length is less than 60 characters when a request for prediction of emojis is sent to the AI model. If the input text length is less than 60 characters when the request is sent to the AI model to predict emojis, the AI engine extrapolates 1311 the input text length to make the input text length equal to 60 by appending designated characters. When the input text length is greater than or equal to 60, then the AI engine receives up to 60 characters of the input text and converts 1312 the 60 characters to an array of numbers using a vocabulary file, for example, vocab.pkl, that contains the character-number mapping. The AI engine converts the input text into an array of numbers of shape (1,60) representing characters input by the user and sent to the AI model for prediction. The AI engine sends 1313 the array to the AI model for processing and prediction of emojis. In an embodiment, using the AI model comprising Conv1D and dense layers, the AI engine predicts the probability of all the emojis for the input sentence and generates 1314 probabilities of, for example, 200 emojis on which the AI model is trained. In an embodiment, the AI engine identifies 1315 all emojis whose probability is higher than 80%. In one embodiment, the AI engine requires increased model size to handle the dimensionality of the dense layers. For example, the model size is increased up to 12 MB. In one embodiment, to accommodate both the number of emojis and the size of the model, the AI engine develops a strategy where clustered emojis as found to be contextually similar. In one embodiment, the AI engine clusters emojis using the strategy of mapping similar emojis and their corresponding words. In one embodiment, data consisted of single sentences per line with emoji being placed as it is, is used by the user. In one embodiment, the AI engine decides a threshold and emojis with similarities are clustered. For example, cluster one includes, '☺', '☺', '☺', '☺', '☺', '☺', '☺', '☺', '☺', '☺'; cluster two includes, '☺', '☺', '☺', '☺', '♥', '☺', '✉', '♀', '♥', '☺', '♥', '☺', '☺'. For example, 89 such emoji clusters are identified and the AI engine maps sentences to the cluster to which their respective emoji belonged to. In one embodiment, the AI engine carries out the procedure of creating forest of trees using ANNOY and clusters similar sentences using a threshold of similarity. In one embodiment, the AI engine trains the model on this corpus which resulted in a reduced size of the model. For example, the size of the model is 6 MB which helps in overall increased accuracy to predict the correct emoji to 80.1%.

In one embodiment, the AI engine obtains 1316 emojis from a keyword-based mapping. In one embodiment, the AI engine obtains 1317 recently used emojis from a local database on the electronic device. In one embodiment, the AI engine obtains 1318 frequently used emojis from the local database. in The detailed description of various exemplary embodiments of the disclosure is described herein with reference to the accompanying drawings. It should be noted that the embodiments are described herein in such details as to clearly communicate the disclosure. However, the details provided herein is not intended to limit the anticipated variations of embodiments; on the contrary, the intention is to cover all modifications, equivalents, and alternatives falling within the spirit and scope of the present disclosure as defined by the appended claims.

According to an embodiment, the AI engine obtains 1319 the globally most used emojis. In an example, the AI engine fills slots of the emoji bar in the following order:

The AI engine renders the emojis whose probability is greater than 80%; then renders all emojis based on a keyword search that are not already displayed; then renders recently used emojis that are not already displayed; then renders the most used emojis that are not already displayed; and then renders all globally most used emojis that are not already displayed. At step 1320, if the user starts using an emoji from the emoji bar or an emoji layout from the keyboard interface, the AI engine stores the emoji in a stack or a database to display the most recent emoji first on the emoji bar. The AI engine also increments the count of the emoji usage. As the user starts using the emoji and starts sending the emoji from the emoji bar, the AI engine dynamically updates the emoji bar based on the user preferences.

FIG. 14 illustrates a graphical user interface (GUI) 1401 displayed on a display unit of an electronic device, showing a rendering of emoji suggestions on a quick access emoji interface 1404, also referred to as an "emoji bar", according to an embodiment of the present invention. When a user invokes an input interface, for example, the keyboard interface 1403, through a user application, the AI engine displays a predetermined number of emojis, for example, the globally most used emojis by default in the emoji bar 1404 positioned in a row of the keyboard interface 1403. If a number row 1405 is displayed on the keyboard interface 1403, the AI engine allows the user to switch between the number row 1405 and the emoji bar 1404 as per the requirements of the user. In an embodiment, the emoji bar 1404 and the number row 1405 are switchable based on the application used by the keyboard interface 1403.

In an embodiment, the AI engine displays emoji suggestions and predictions above the keyboard interface 1403 at the number row 1405. According to the requirement of the user, the keyboard interface 1403 switches the locations of the number row 1405 and the emoji bar 1404. When a user starts typing text in an input field 1402 provided by the user application, the AI engine dynamically predicts the emoji based on the character mapping using the AI model trained as disclosed above. In an example, the AI engine renders the emojis in the emoji bar 1404 in 9 slots in the following order: Most sent emoji>Recently used emoji>remaining top 9 emojis. The AI engine personalizes the emoji suggestions according to different factors, for example, the text typed by the user that allows the AI model to predict relative emotions; most sent emojis that, in an embodiment, have the highest priority; recently used emojis; globally top used emojis; text entered by users, etc. In an embodiment, the AI engine renders the recently used emojis after the most sent emojis in the emoji bar 1404. In an embodiment, if the AI model is disabled or does not function, then the AI engine renders an emoji suggestion on the emoji bar 1404 at highest priority. In the AI-based system and method disclosed herein, users start receiving the emoji suggestions on the emoji bar 1404 as they start typing in the input field 1402 to allow replacement of a word with a suggested emoji. In an embodiment, the users receive the most used top most used global emojis on the emoji bar 1404 initially, which then start undergoing personalization after the user starts using the emojis and sending the emojis to a recipient user. In an embodiment, the AI engine displays multiple emojis at a time based on the entire sentence typed. Users may select one or more of the suggested emojis to make a conversation fun, expressive, fast, user personalized, and user friendly.

The AI algorithm executed by the AI engine disclosed herein can be used for a variety of text classification tasks, for example, intent detection, sentiment analysis, toxic comment/message filtering, spam detection, etc. The AI-based system and method disclosed herein allow platforms such as e-commerce platforms, news agencies, content curators, blogs, directories, etc., that use automated technologies to classify and tag content, for example, using products, Ext classification. Classifying large textual data helps in standardizing these platforms, optimizes and makes the search relevant, and improves user experience by simplifying navigation. The AI algorithm can be updated and an extended use of word vectors can be implemented in the AI-based system and method disclosed herein. In various embodiments, the AI-based system and method disclosed herein implement bidirectional encoder representations from transformers (BERT), deep contextualized word representations such as ELMo, and the universal sentence encoder for improving accuracy of the AI algorithm. In an embodiment, context handling is improved by following a stepwise approach.

In one embodiment, use of k-means to first cluster the context on a Euclidean distance metric further enhances and optimizes the contextual mapping of vectors.

In an embodiment, the AI-based system and method disclosed herein implement long short-term memory (LSTM) networks while processing sequential data. In one embodiment, the AI-based system and method disclosed herein implement bidirectional LSTMs (BiLSTMs) for addressing problems where the need is to memorize a pattern both forwards and backwards because, while handling context, the AI model needs to understand sarcasm, puns, humour, and various other figures of speech that are intelligible to humans and are often communicated with slang or macaronic language usage. As LSTMs typically generate large model files of, for example, about 90 megabytes (MB) to about 100 MB and are comparatively slow in inference, the AI-based system and method disclosed herein use a convolutional neural network (CNN) to reduce the size of the model files. The reduction in size allows a direct deployment of the AI model to an operating system, for example, an Android operating system, for use by application users.

Furthermore, the AI-based system and method disclosed herein operate with macaronic languages that are a mixture of at least two languages, for example, Hindi and English, where words in a non-English language are entered in a Latin script and mixed with English words therebetween. The AI-based system and method disclosed herein operate with languages that may have no grammar, no defined rules of usage of tenses, spelling variations, etc. For example, a word "bhaiyya" which means "brother" in Hinglish can be spelled as "bhaiya", "bhyia", "bhiya", and many such misspelled variations. The AI engine handles text without any defined spellings entered by users. In the AI-based system and method disclosed herein, word vectors are used for handling such loose rule-based languages. Moreover, to make the AI model understand any language or variations of words, the input message needs to be converted to a format the AI model understands, and therefore, in an embodiment, the input message is converted, for example, into numbers in the AI-based system and method disclosed herein. Use of sentence clustering aids the AI engine in mapping the context to the exact emoji cluster and improves performance in terms of validation and test accuracies.

Figure 15:
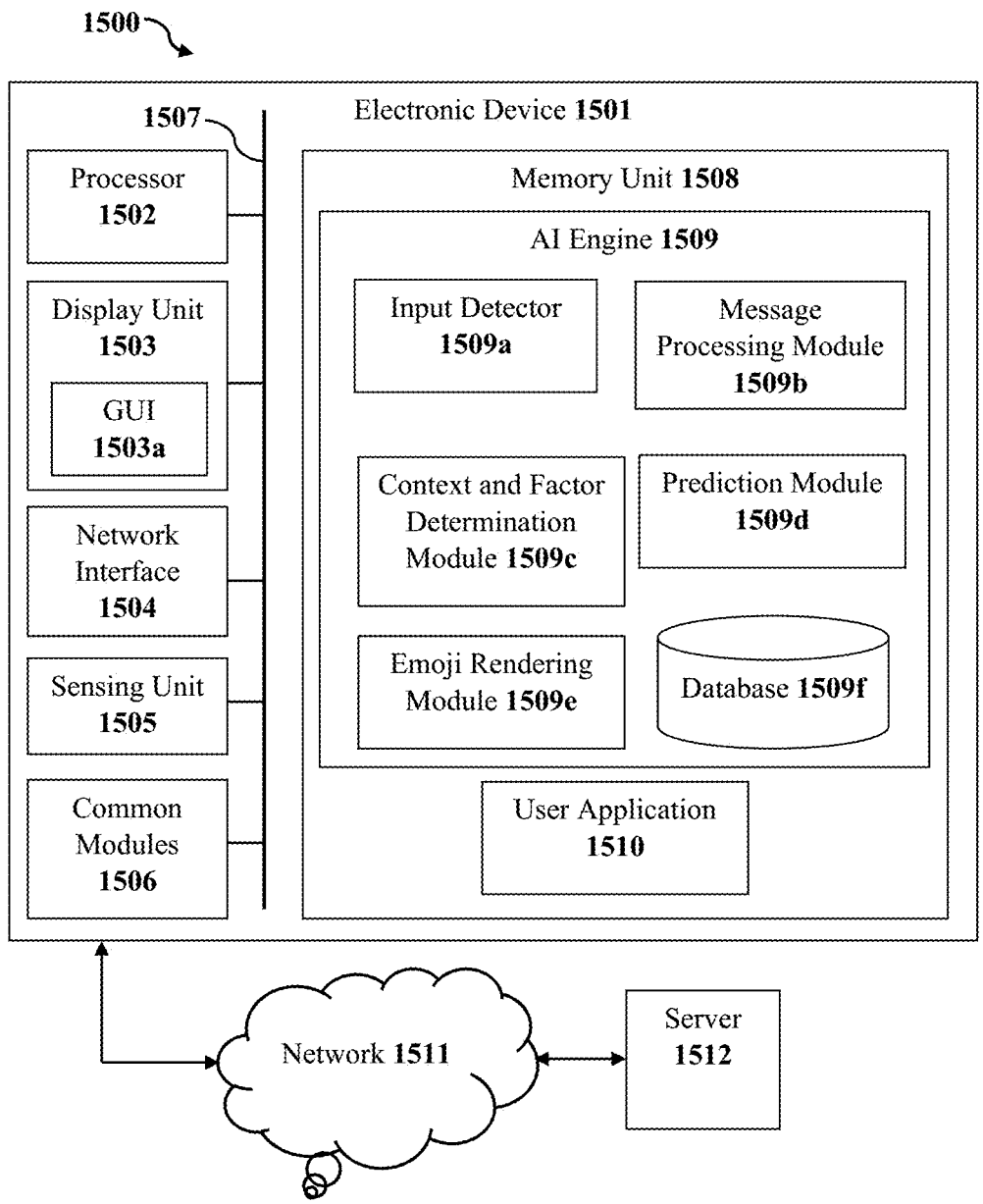
FIG. 15 illustrates an architectural block diagram of an exemplary implementation of an AI-based system for dynamically predicting and suggesting emojis on a quick access emoji interface in real time, according to an embodiment of the present invention.

FIG. 15 illustrates an architectural block diagram of an exemplary implementation of the AI-based system 1500 (alternatively referred to as a system) for dynamically predicting and suggesting emojis on a quick access emoji interface in real time, according to an embodiment of the present invention. Various aspects of the present invention may be embodied as a system, a method, or a non-transitory, computer-readable storage medium having one or more computer-readable program codes stored thereon. Accordingly, various embodiments of the present invention may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". As used herein, "non-transitory, computer-readable storage medium" refers to all computer-readable storage media that contains and stores computer programs and data. Examples of the computer-readable storage media comprise hard drives, solid state drives, optical discs or magnetic disks, memory chips, a read-only memory (ROM), a register memory, a processor cache, a random-access memory (RAM), etc.

In an embodiment, the AI-based system 1500 disclosed herein comprises the AI engine 1509 (alternatively referred to as an 'engine') implemented in an electronic device 1501 as illustrated in FIG. 15. The electronic device 1501 is a computing device, for example, one or more of a personal computer, a tablet computing device, a mobile computer, a smart phone, a portable computing device, a laptop, a wearable computing device such as smart glasses, a smart watch, etc., a touch centric device, a workstation, a client device, a portable electronic device, a network-enabled computing device, an interactive network-enabled communication device, a gaming device, an image capture device, a web browser, a portable media player, a video recorder, any other suitable computing equipment or combinations of multiple pieces of computing equipment.

In an embodiment, the AI engine 1509 is implemented using programmed and purposeful hardware of the electronic device 1501. In an embodiment, the AI engine 1509 is accessible to users, for example, through a broad spectrum of technologies and user devices such as smart phones, tablet computing devices, endpoint devices, etc., with access to a network 1511, for example, a short-range network or a long-range network. The network 1511 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the AI engine 1509 deployed in the electronic device 1501 communicates with a server 1512 via the network 1511, for example, for downloading a current version of the emoji mappings and the AI model for dynamically predicting and suggesting emojis on a quick access emoji interface in real time as disclosed in the detailed description of FIGS. 13A-13B. In an embodiment, the current version of the emoji mappings and the AI model files are stored in a local database 1509f.

As illustrated in FIG. 15, the electronic device 1501 comprises at least one processor 1502 and a non-transitory, computer-readable storage medium, for example, a memory unit 1508, for storing computer program instructions defined by the modules, for example, 1509a, 1509b, 1509c, 1509d, and 1509e of the AI engine 1509. The memory unit 1508 is used for storing program instructions, applications, and data. The memory unit 1508 is, for example, a random-access memory (RAM) or another type of dynamic storage device that stores information and instructions for execution by the processor 1502. The memory unit 1508 also stores temporary variables and other intermediate information used during execution of the instructions by the processor 1502. The electronic device 1501 further comprises read only memories (ROMs) or other types of static storage devices that store static information and instructions for execution by the processor 1502. In an embodiment, the modules, for example, 1509a, 1509b, 1509c, 1509d, and 1509e and the database 1509f of the AI engine 1509 are stored in the memory unit 1508 as illustrated in FIG. 15.

The processor 1502 is operably and communicatively coupled to the memory unit 1508 for executing the computer program instructions defined by the modules, for example, 1509a, 1509b, 1509c, 1509d, and 1509e of the AI engine 1509. The processor 1502 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 1502 is implemented as a processor set comprising, for example, a programmed microprocessor and a math or graphics co-processor. The AI engine 1509 is not limited to employing the processor 1502. In an embodiment, the AI engine 1509 employs one or more controllers or microcontrollers.

As illustrated in FIG. 15, the electronic device 1501 further comprises a data bus 1507, a display unit 1503, a network interface 1504, a sensing unit 1505, and common modules 1506. The data bus 1507 permits communications between the modules, for example, 1502, 1503, 1504, 1505, 1506, and 1508. The display unit 1503, via a graphical user interface (GUI) 1503a, displays information, display interfaces, media content, user interface elements such as checkboxes, input text fields, etc., for example, for allowing a user to invoke and execute the AI engine 1509, input text into an input field provided by a user application 1510 (or messaging application), select an emoji from the emoji suggestions rendered on the quick access emoji interface, etc. The GUI 1503a comprises, for example, online web interfaces, web-based downloadable application interfaces, mobile-based downloadable application interfaces, etc.

The network interface 1504 enables connection of the AI engine 1509 to the network 1511. In an embodiment, the network interface 1504 is provided as an interface card also referred to as a line card. The network interface 1504 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The sensing unit 1505 comprises one or more sensors operably coupled to the processor 1502 of the electronic device 1501. The sensors comprise, for example, tactile sensors, image sensors, motion sensors, gesture sensors, etc., and other sensors configured to receive inputs of different types from a user. The common modules 1506 of the electronic device 1501 comprise, for example, input/output (I/O) controllers, input devices, output devices, fixed media drives such as hard drives, removable media drives for receiving removable media, etc. Computer applications and programs are used for operating the AI engine 1509. The programs are loaded onto fixed media drives and into the memory unit 1508 via the removable media drives. In an embodiment, the computer applications and programs are loaded into the memory unit 1508 directly via the network 1511.

In an embodiment, the AI engine 1509 comprises multiple modules defining computer program instructions, which when executed by the processor 1502, cause the processor 1502 to dynamically predict and suggest emojis on a quick access emoji interface in real time. In an embodiment, the modules of the AI engine 1509 comprise an input detector 1509a, a message processing module 1509b, a context and factor determination module 1509c, a prediction module 1509d, and an emoji rendering module 1509e. The input detector 1509a detects an input message in an input field provided on the GUI of the user application 1510. The message processing module 1509b processes the input message to identify multiple elements, for example, character elements, grammatical elements, numeric elements, image elements, line break elements, space elements, patterns, etc., of the input message. The context and factor determination module 1509c analyses and determines a context and multiple factors associated with the input message for each of the identified elements of the input message using an AI model that is trained as disclosed above. The factors associated with the input message comprise, for example, a location of the input message, positions of the emojis in the input message, one or more languages including macaronic languages of the input message, intent of the input message, user preferences, global preferences, etc. The prediction module 1509d, in communication with the context and factor determination module 1509c, dynamically generates predictions of emojis based on the determined context and one or more of the factors in real time.

The emoji rendering module 1509e renders one or more grouped sets of the emojis on the quick access emoji interface based on the dynamically generated predictions.

In an embodiment, the grouped sets of emojis comprise, for example, most sent emojis, recently sent emojis, and global emojis. The emoji rendering module 1509e renders emojis related to the context and/or the intent of the input message, most sent emojis, recently used emojis, and top globally used emojis in a dynamically configurable order on the quick access emoji interface. Furthermore, the emoji rendering module 1509e renders the emoji suggestions as a user starts entering a message in the input field provided by the user application 1510 for convenient replacement of a word with a desired emoji. In an embodiment when the input message in not detected in the input field of the user application 1510, the emoji rendering module 1509e renders preconfigured grouped sets of emojis on the quick access emoji interface.

The input detector 1509a, the message processing module 1509b, the context and factor determination module 1509c, the prediction module 1509d, and the emoji rendering module 1509e are disclosed above as software executed by the processor 1502. In an embodiment, the modules, for example, 1509a, 1509b, 1509c, 1509d, and 1509e of the AI engine 1509 are implemented completely in hardware. In one embodiment, the modules, for example, 1509a, 1509b, 1509c, 1509d, and 1509e of the AI engine 1509 are implemented by logic circuits to carry out their respective functions disclosed above. In one embodiment, the AI engine 1509 is also implemented as a combination of hardware and software including one or more processors, for example, 1502, that are used to implement the modules, for example, 1509a, 1509b, 1509c, 1509d, and 1509e of the AI engine 1509. The processor 1502 retrieves instructions defined by the input detector 1509a, the message processing module 1509b, the context and factor determination module 1509c, the prediction module 1509d, and the emoji rendering module 1509e from the memory unit 1508 for performing respective functions disclosed above.

For purposes of illustration, the detailed description refers to the modules, for example, 1509a, 1509b, 1509c, 1509d, 1509e, and 1509f of the AI engine 1509 being run locally on a single computer system; however the scope of the AI-based system 1500 and method disclosed herein is not limited to the modules, for example, 1509a, 1509b, 1509c, 1509d, 1509e, and 1509f of the AI engine 1509 being run locally on a single computer system via the operating system and the processor 1502, but may be extended to run remotely over the network 1511 by employing a web browser and a remote server, a mobile phone, or other electronic devices. In an embodiment, one or more portions of the AI-based system 1500 disclosed herein are distributed across one or more computer systems (not shown) coupled to the network 1511.

The non-transitory, computer-readable storage medium disclosed herein stores computer program instructions executable by the processor 1502 for dynamically predicting and suggesting emojis on a quick access emoji interface in real time. The computer program instructions implement the processes of various embodiments disclosed above and perform additional steps that may be required and contemplated for dynamically predicting and suggesting emojis on a quick access emoji interface in real time. When the computer program instructions are executed by the processor 1502, the computer program instructions cause the processor 1502 to perform the steps of the AI-based method for dynamically predicting and suggesting emojis on a quick access emoji interface in real time as disclosed above. In an embodiment, a single piece of computer program code comprising computer program instructions performs one or more steps of the AI-based method disclosed above. The processor 1502 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic. The computer program codes comprising computer readable and executable instructions can be implemented in any programming language. In an embodiment, the computer program codes or software programs are stored on or in one or more mediums as object code.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. Where databases are described, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In one embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In one embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via the network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The disclosure describes a system and method for dynamically predicting and suggesting emojis on messages using artificial intelligence. The system uses an AI based algorithm in a fastText module, wherein the fastText module is used to find out similar words for an emoji and to find contextually similar emojis. FastText module has been known for both word vector representation and text classification tasks. The system and method for dynamically predicting and suggesting emojis on messages will hugely help in getting rid of unnecessary sentences and to have a dataset that has true emoji-word mapping combination. Usage of emoji-word mapping combination will improve the accuracy metric and it also assist in incorporating a bigger number of emojis in a textual conversation without increasing the model size. Further, the system and method for dynamically predicting and suggesting emojis on messages is helpful in successfully creating a vocabulary for a no rule language such as the mixture of Hindi and English languages like Hinglish (Macaronic language).

The foregoing examples and illustrative implementations of various embodiments have been provided merely for explanation and are in no way to be construed as limiting of the present invention. While the present invention has been described with reference to various embodiments, illustrative implementations, drawings, and techniques, it is understood that the words, which have been used herein, are words of description and illustration, rather than words of limitation. Further, although the present invention has been described with reference to particular means, materials, embodiments, techniques, and implementations, the present invention is not intended to be limited to the particulars disclosed herein; rather, the present invention extends to all functionally equivalent structures, methods and uses, such as are within the scope of the appended claims. It will be understood by those skilled in the art, having the benefit of the teachings of this specification, that the present invention is capable of modifications and other embodiments may be effected and changes may be made thereto, without departing from the scope and spirit of the present invention.

What is claimed is:

1. A system for dynamically predicting and suggesting digital pictorial images on a quick access pictorial image interface, the system comprising:
    an electronic device comprising an input device, at least one processor, a memory unit operably and communicatively coupled to the processor, and a display unit;
    a sensing unit comprising one or more of a plurality of sensors and operably coupled to the processor of the electronic device; and
    an A.I. engine operably coupled to the sensing unit, the processor, and a messaging application deployed on the electronic device, wherein the A.I. engine is configured to:
        identify a plurality of elements of an input message of a user on the messaging application;
        determine a context of the input message for each of the identified plurality of elements of the input message;
        analyze a plurality of factors associated with the input message for each of the identified plurality elements; and
        dynamically generate a prediction of an emoji based on the determined context and the analyzed plurality of factors associated with the input message, and wherein said factors include a location of the input message, an intent of the input message, and positions of any emojis present in the input message; and
    wherein the A.I. engine is configured to:
        positionally collapse or filter the emojis present in the input message to facilitate subsequent context extraction associated with each of said emojis:
        maintain a positional grouping of said emojis and store indices representative of said positional grouping in an array, and map the context of the input message to each of said emojis present in the input message and map text of the input message to each of said emojis present within said positional grouping;
        learn and predict different emojis applicable for the input message or the text of the input message, based on an understanding that same text is mapped to said different emojis, indicative of use of said different emojis to express same emotion;
        cluster sentences within a similarity of a pre-configured threshold and above, and map said cluster to most frequently used emojis present in said cluster, and represent said most frequently used emojis as an emoji vector:
        map the context of clustered sentences to said emoji vector;
        said A.I. engine further configured to map said context of said clustered statements to each of the emojis present in said emoji cluster as different labels, thereby enabling multi-label classification wherein each statement is mapped to a single emoji or multiple emojis.

2. A method for dynamically predicting and suggesting digital pictorial images on a quick access pictorial image interface, the method comprising steps of:

rendering, by an input device of an electronic device, a touch-enabled keyboard interface on a display unit of the electronic device;

identifying, by an A.I. engine, a plurality of elements of an input message of a user on the messaging application;

determining, by the A.I. engine, a context of the input message for each identified plurality of elements of the input message:

analyzing, by the A.I. engine, a plurality of factors associated with the input message for said each identified plurality elements; and dynamically generating, by the A.I. engine, a prediction of an emoji based on the determined context and the analyzed plurality of factors associated with the input message, and wherein said factors include a location of the input message, an intent of the input message, and positions of any emojis present in the input message; and wherein the step of dynamically generating said prediction of an emoji further includes the following steps:

collapsing or filtering positionally, by the A.I. engine, the emojis present in the input message to facilitate subsequent context extraction associated with each of said emojis;

maintaining, by the A.I. engine, a positional grouping of said emojis and storing, by the A.I. engine, indices representative of said positional grouping in an array;

mapping, by the A.I. engine, the context of the input message to each of said emojis present in the input message and mapping text of the input message to each of said emojis present within said positional grouping;

learning and predicting, by the A.I. engine, different emojis applicable for the input message or the text of the input message, based on an understanding that same text is mapped to said different emojis, thereby indicating use of said different emojis to express same emotion;

clustering, by the A.I. engine, sentences within a similarity of a pre-configured threshold and above, and map said cluster to most frequently used emojis present in said cluster, and represent said most frequently used emojis as an emoji vector;

mapping, by the A.I. engine, the context of clustered sentences to said emoji vector; and mapping, by the A.I. engine, said context of said clustered statements to each of the emojis present in said emoji cluster as different labels, thereby enabling multi-label classification wherein each statement is mapped to a single emoji or multiple emojis.

3. The system as claimed in claim 1, wherein said plurality of elements include a character element, a grammatical element, a numeric element, an image element, a line break element, a space element, and a pattern.

4. The system as claimed in claim 1, wherein said A.I. engine is further configured to:

render one or more grouped sets of emojis on a quick access emoji interface based on the dynamically generated prediction, and wherein the rendered grouped sets of emojis include most sent emojis, recently sent emojis, and global emojis;

render said one or more grouped sets of emojis in response to the user entering at least a part of the input message in an input field of said quick access emoji interface; and render said one or more grouped sets of emojis on said quick access emoji interface in response to an absence of the input message.

5. The method as claimed in claim 2, wherein the method further includes following steps:

rendering, by said A.I. engine, one or more grouped sets of emojis on a quick access emoji interface based on the dynamically generated prediction, and wherein said grouped sets of emojis include most sent emojis, recently sent emojis, and global emojis;

rendering, by said A.I. engine, said one or more grouped sets of emojis on said quick access emoji interface in response to the user entering at least a part of said input message; and rendering, by said A.I. engine, said one or more grouped sets of emojis on said quick access emoji interface when said input message from the user is absent.

* * * * *